(12) United States Patent
Adkins

(10) Patent No.: US 10,652,197 B2
(45) Date of Patent: *May 12, 2020

(54) SYSTEMS AND METHODS FOR DIRECTING MESSAGES BASED ON SOCIAL DATA

(71) Applicant: Facebook, Inc., Menlo Park, CA (US)

(72) Inventor: Michael David Adkins, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,042

(22) Filed: Oct. 19, 2017

(65) Prior Publication Data

US 2018/0041464 A1     Feb. 8, 2018

Related U.S. Application Data

(63) Continuation of application No. 14/328,646, filed on Jul. 10, 2014, now Pat. No. 9,825,899.

(51) Int. Cl.
*H04L 12/58* (2006.01)

(52) U.S. Cl.
CPC .............. *H04L 51/32* (2013.01); *H04L 51/12* (2013.01)

(58) Field of Classification Search
CPC ...... G06Q 10/10; G06Q 50/01; G06Q 10/107; G06Q 10/063; G06Q 10/06314; G06Q 10/109; G06Q 10/1093; G06Q 10/1095; H04L 51/36; H04L 67/18; H04L 67/22; H04L 29/12132; H04L 61/1552; H04L 67/04; H04L 67/104; H04L 67/14; H04L 67/24; H04L 69/329; H04W 4/02; H04W 4/206; H04W 4/021; H04W 4/023; H04W 4/08; H04W 76/02; H04W 8/18
See application file for complete search history.

(56) References Cited

U.S. PATENT DOCUMENTS

| | | | |
|---|---|---|---|
| 6,480,885 B1 | 11/2002 | Olivier | |
| 7,620,691 B1* | 11/2009 | Goldman | .......... H04L 29/12594 709/204 |
| 7,831,684 B1 | 11/2010 | Lawler | |
| 8,443,005 B1 | 5/2013 | Goldman | |

(Continued)

OTHER PUBLICATIONS

Song, Jonghyuk et al., "Spam Filtering in Twitter Using Sender-Receiver Relationship," Proceedings of the 14th International Conference on Recent Advances in Intrusion Detection, pp. 301-317, Sep. 20, 2011.

*Primary Examiner* — Greg C Bengzon
(74) *Attorney, Agent, or Firm* — Sheppard Mullin Richter & Hampton LLP

(57) ABSTRACT

Systems, methods, and non-transitory computer-readable media can receive a request to send a message from a sender to a recipient. It can be determined that the sender and the recipient have at least a specified number of degrees of separation within a social network. The systems, methods, and non-transitory computer readable media can acquire social data about at least one of a set of groups joined by the sender and the recipient, a set of events attended by the sender and the recipient, a set of locations visited by the sender and the recipient, or a set of common interests shared by the sender and the recipient. It can be determined whether to deliver the message to a primary inbox of the recipient based on the social data.

20 Claims, 10 Drawing Sheets

(56) References Cited

U.S. PATENT DOCUMENTS

| | | | |
|---|---|---|---|
| 8,739,016 | B1 | 5/2014 | Goldman |
| 9,350,743 | B2* | 5/2016 | Wiley ..................... H04L 67/10 |
| 2004/0002932 | A1 | 1/2004 | Horvitz |
| 2005/0015432 | A1* | 1/2005 | Cohen ................... G06Q 10/107 |
| | | | 709/201 |
| 2005/0041789 | A1 | 2/2005 | Warren-Smith |
| 2005/0097170 | A1 | 5/2005 | Zhu |
| 2006/0168033 | A1* | 7/2006 | Cai ....................... G06Q 10/107 |
| | | | 709/206 |
| 2006/0218111 | A1* | 9/2006 | Cohen ................. G06F 16/9535 |
| | | | 706/45 |
| 2007/0156886 | A1 | 7/2007 | Srivastava |
| 2007/0179945 | A1 | 8/2007 | Marston |
| 2008/0071872 | A1 | 3/2008 | Gross |
| 2009/0006285 | A1 | 1/2009 | Meek |
| 2009/0132652 | A1 | 5/2009 | Athale |
| 2010/0049852 | A1 | 2/2010 | Whitnah |
| 2010/0115040 | A1 | 5/2010 | Sargent |
| 2010/0161369 | A1 | 6/2010 | Farrell |
| 2011/0010182 | A1 | 1/2011 | Turski |
| 2011/0060802 | A1 | 3/2011 | Katsikas |
| 2011/0238755 | A1* | 9/2011 | Khan ....................... H04W 4/21 |
| | | | 709/204 |
| 2011/0246584 | A1* | 10/2011 | Vitaldevara ............. H04L 51/12 |
| | | | 709/206 |
| 2011/0252079 | A1 | 10/2011 | Werner |
| 2011/0252099 | A1 | 10/2011 | Pattekar |
| 2011/0289011 | A1* | 11/2011 | Hull ..................... G06Q 10/107 |
| | | | 705/319 |
| 2012/0042392 | A1* | 2/2012 | Wu ....................... H04L 63/0421 |
| | | | 726/28 |
| 2012/0072432 | A1 | 3/2012 | Crosa |
| 2012/0084666 | A1 | 4/2012 | Hickman |
| 2012/0101970 | A1* | 4/2012 | Zernik ................... G06Q 10/10 |
| | | | 706/45 |
| 2012/0124085 | A1 | 5/2012 | Baber |
| 2012/0131107 | A1* | 5/2012 | Yost ....................... H04L 51/12 |
| | | | 709/206 |
| 2012/0203832 | A1 | 8/2012 | Vastardis |
| 2012/0209839 | A1 | 8/2012 | Andrews |
| 2012/0246301 | A1 | 9/2012 | Vyrros |
| 2012/0303726 | A1 | 11/2012 | Hwang |
| 2012/0331053 | A1 | 12/2012 | Dunn |
| 2013/0018965 | A1* | 1/2013 | Ramachandran .... G06Q 10/107 |
| | | | 709/206 |
| 2013/0212229 | A1 | 8/2013 | Vastardis |
| 2013/0254299 | A1* | 9/2013 | Burshtein ............ G06Q 10/107 |
| | | | 709/206 |
| 2014/0019544 | A1* | 1/2014 | Palmert ............. G06F 15/17306 |
| | | | 709/204 |
| 2014/0052782 | A1 | 2/2014 | Ryan |
| 2014/0123228 | A1 | 5/2014 | Brill |
| 2014/0129942 | A1 | 5/2014 | Rathod |
| 2014/0250178 | A1 | 9/2014 | Horling |
| 2014/0280152 | A1 | 9/2014 | Jin |
| 2014/0351339 | A1 | 11/2014 | Kaneoka |
| 2014/0379796 | A1 | 12/2014 | Altaf |
| 2015/0026211 | A1* | 1/2015 | Martino ................ H04L 67/306 |
| | | | 707/770 |
| 2015/0033147 | A1* | 1/2015 | Patel ................... G06Q 10/109 |
| | | | 715/753 |
| 2015/0082448 | A1 | 3/2015 | Elovici |
| 2015/0149552 | A1* | 5/2015 | Oh ......................... G06Q 10/10 |
| | | | 709/204 |
| 2015/0222719 | A1* | 8/2015 | Hein ...................... G06Q 10/10 |
| | | | 709/204 |
| 2015/0256499 | A1* | 9/2015 | Kumar .................. G06F 16/958 |
| | | | 709/206 |
| 2015/0302103 | A1* | 10/2015 | Jeremias ............. G06F 16/9535 |
| | | | 715/758 |
| 2015/0319203 | A1 | 11/2015 | Jeremias |
| 2015/0370909 | A1 | 12/2015 | Volach |
| 2016/0134579 | A1* | 5/2016 | Buddenbaum .......... H04L 51/32 |
| | | | 709/206 |
| 2016/0212081 | A1* | 7/2016 | Kim ....................... H04L 51/12 |
| 2017/0111327 | A1* | 4/2017 | Wu ....................... H04L 63/107 |

\* cited by examiner

SYSTEMS AND METHODS FOR DIRECTING MESSAGES BASED ON SOCIAL DATA

CROSS-REFERENCE TO RELATED APPLICATIONS

This application is a continuation of U.S. patent application Ser. No. 14/328,646, filed on Jul. 10, 2014 and entitled "SYSTEMS AND METHODS FOR DIRECTING MESSAGES BASED ON SOCIAL DATA", which is incorporated herein by reference in its entirety.

FIELD OF THE INVENTION

The present technology relates to the field of delivering messages. More particularly, the present technology provides techniques for directing messages based on social data.

BACKGROUND

Today, people often utilize computing devices (or systems) for a wide variety of purposes. Users can use their computing devices to, for example, create documents, read articles, view images, watch videos, listen to audio, and engage in communications. In some instances, a user of a computing device can access or interact with a social networking service (or system) via the computing device. The user can connect with other users within the social networking service. The user can also send messages to and receive messages from other users within the social networking service. However, in some cases, the user can receive undesired content, such as spam messages, abusive messages, or unimportant messages.

Conventional approaches can filter out some obvious spam messages, abusive messages, and illegitimate messages, but often times undesired content can still pass through and be delivered. Moreover, under conventional approaches, many desired or relevant messages are incorrectly filtered out and thus are not delivered. These and other similar concerns can create challenges for and reduce the overall user experience associated with using messaging systems and social networking services.

SUMMARY

Various embodiments of the present disclosure can include systems, methods, and non-transitory computer readable media configured to receive a request to send a message from a sender to a recipient. It can be determined that the sender and the recipient have at least a specified number of degrees of separation within a social network. The systems, methods, and non-transitory computer readable media can acquire social data about at least one of a set of groups joined by the sender and the recipient, a set of events attended by the sender and the recipient, a set of locations visited by the sender and the recipient, or a set of common interests shared by the sender and the recipient. It can be determined whether to deliver the message to a primary inbox of the recipient based on the social data.

In one embodiment, the at least the specified number of degrees of separation can correspond to at least three degrees of separation. For example, the sender and the recipient may not be connected with each other (e.g., may not be "Friends") within the social network. Additionally, the sender and the recipient may not have any mutual connections (e.g., mutual "Friends") between them.

In one embodiment, it can be determined that one or more privacy settings of the recipient allow for communications with users who have the at least the specified number of degrees of separation with respect to the recipient. For example, it can be determined that the recipient has set basic, normal, and/or relaxed privacy settings for messages, as opposed to strict privacy settings.

In one embodiment, it can be determined that the recipient has not previously declined a connection request from the sender.

In one embodiment, it can be determined that the sender has not been reported, within a specified time period, to be associated with undesired content (e.g., spam messages, abusive messages, phishing messages, etc.).

In one embodiment, the message can be delivered to a secondary inbox of the recipient by default. For example, the secondary inbox can correspond to a message mail-box or folder labeled as "Other", while the primary inbox can correspond to a message mail-box or folder labeled as "Inbox".

In one embodiment, a confidence score for the message can be determined based on the social data. The message can be delivered to the primary inbox instead of the secondary inbox when the confidence score satisfies a specified threshold.

In one embodiment, the social data can indicate a membership size of a group within the set of groups joined by the sender and the recipient. The confidence score for the message can be increased when the membership size is smaller, and the confidence score for the message can be decreased (i.e., or may not necessarily be increased) when the membership size is larger.

In one embodiment, a user influence score can be determined for the sender. The user influence score can be indicative of a reputation of the sender within the social network. The confidence score for the message can be increased when the user influence score is higher, and the confidence score can be decreased when the user influence score is lower.

In one embodiment, the user influence score can be decreased when the sender is reported to be associated, within a specified time period, with undesired content.

In one embodiment, the user influence score can be decreased when the sender is reported to be associated, within a specified time period, with other users who are reported to be associated with undesired content.

In one embodiment, the social data can indicate a time frame for an event within the set of events attended by the sender and the recipient. The confidence score for the message can be increased when the request to send the message is received closer in time to the time frame, and the confidence score for the message can be decreased when the request to send the message is received further away in time from the time frame.

In one embodiment, the social data can indicate an attendance size of an event within the set of events attended by the sender and the recipient. The confidence score for the message can be increased when the attendance size is smaller, and the confidence score for the message can be decreased (i.e., or may not necessarily be increased) when the attendance size is larger.

In one embodiment, the social data can indicate at least one of a location quantity or a location frequency associated with the set of locations visited by the sender and the recipient. The confidence score for the message can be increased when the at least one of the location quantity or the location frequency is higher. The confidence score for the message can be decreased (i.e., or may not necessarily be increased) when the at least one of the location quantity or the location frequency is lower.

In one embodiment, the set of locations visited by the sender and the recipient can be determined based on at least one of check-in data, tag data, global positioning system (GPS) data, WiFi data, Bluetooth data, near field communications (NFC) data, wireless signal (e.g., cellular) triangulation data, or wireless signal multilateration data.

In one embodiment, the set of common interests can include at least one of a set of pages supported by the sender and the recipient or a set of applications installed by the sender and the recipient.

In one embodiment, the determining of whether to deliver the message to the primary inbox can be further based on an analysis of at least a portion of content within the message. For example, at least a portion of text within the message can be analyzed to determine one or more keywords. If the one or more keywords are determined to be desired or appropriate (e.g., relevant, important, etc.), then the confidence score for the message can be increased. If the keywords are determined to be undesired or inappropriate (e.g., spam related, abusive, unimportant, etc.), then the confidence score for the message can be decreased.

In one embodiment, the request can be received from a third party service. The sender and the recipient can be associated with the third party service. The third party service can provide, at least in part, communications functionality. For example, the sender can attempt to send the message to the recipient via the third party service. The third party service can request the social networking system for permission and/or instructions to deliver the message. The social networking system can make a determination as to whether the message should be allowed for delivery to the primary inbox of the recipient. The social network can provide its determination to the third party service, which can then direct the message for delivery accordingly.

In one embodiment, the third party service can correspond to at least one of a social networking application, a social media application, a communications application, a gaming application, or a location-based application.

Many other features and embodiments of the invention will be apparent from the accompanying drawings and from the following detailed description.

Figure 1:
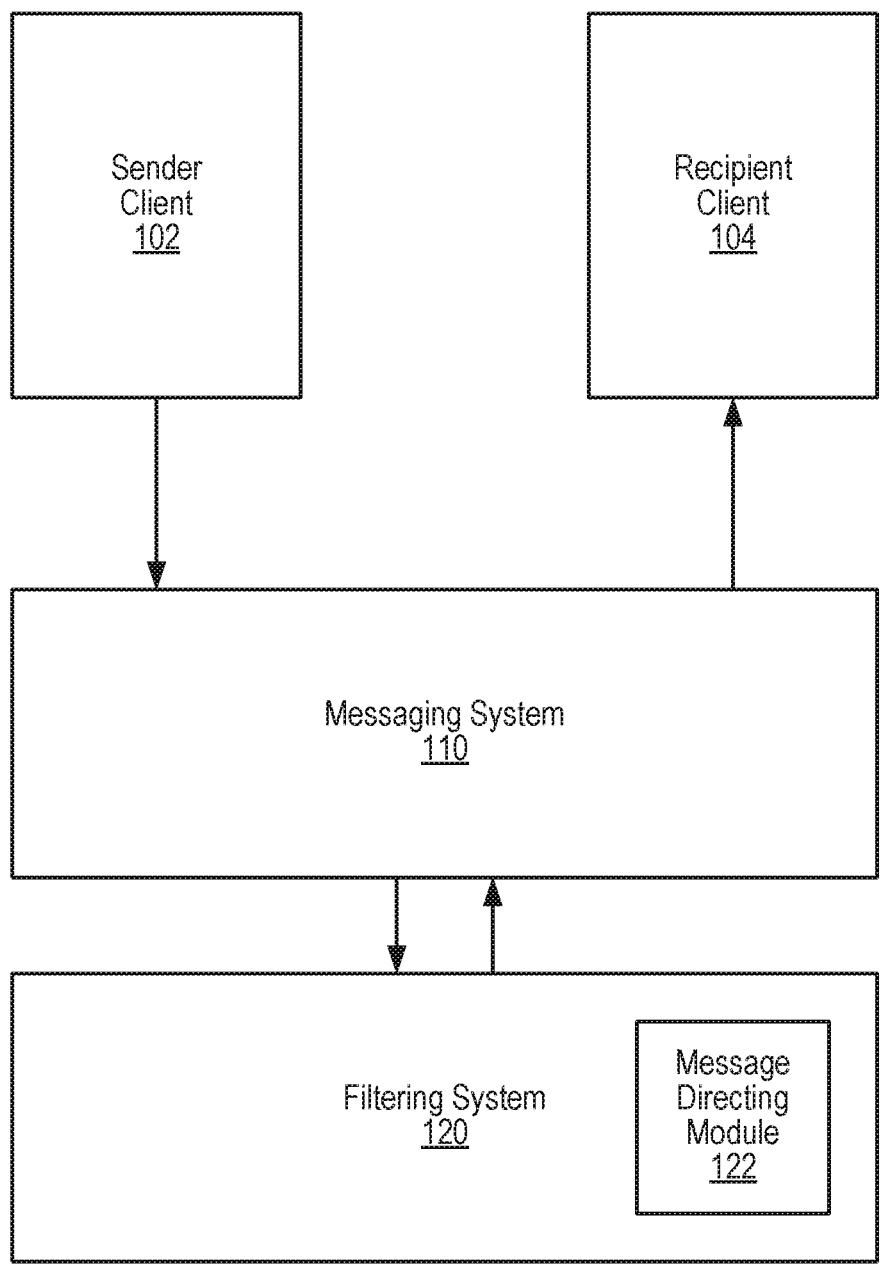
FIG. 1 illustrates an example system configured to facilitate directing messages based on social data, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Directing Messages Based on Social Data

People use social networking services (or systems) for various purposes. In one example, users of a social networking service can connect with other users by becoming "Friends" within the social networking service. In another example, the users can join various groups or organizations within the social networking service. Moreover, the social networking service can, for example, be used to plan or organize events, which can be attended by the users. In a further example, users can support or "Like" particular interests via the social networking service.

Often times, the social networking service can also provide a messaging system. The messaging system within the social networking service can allow its users to communicate with one another. However, under conventional approaches, spam messages, phishing message, abusive messages, and other undesired content can sometimes be delivered to a user's primary messaging inbox within the social networking service. Furthermore, in some cases, desired content including relevant or important messages can be filtered out and thus prevented from being delivered to the intended user's primary messaging inbox. These and other concerns can reduce the user experience associated with the messaging system in particular and with the social networking service in general.

Accordingly, it can be beneficial to provide an improved approach to delivering messages via the social networking service. Various embodiments of the present disclosure can utilize social data to determine how to direct a message to be delivered. In general, social data can refer to any dada associated with the social networking service. In one example, the social networking service can utilize an internal graph infrastructure to represent various entities, connections, organizations, events, etc. The social data can, for example, include data related to or based on the internal graph infrastructure. In another example, social data can include information about one or more settings or preferences selected by users of the social networking service. It is contemplated that many other uses, applications, and/or variations are possible.

FIG. 1 illustrates an example system 100 configured to facilitate directing messages based on social data, according to an embodiment of the present disclosure. The example 100 can include a sender client 102, a recipient client 104, a messaging system 110, and a filtering system 120. As shown in FIG. 1, the filtering system 120 can also include a message directing module 122.

In some embodiments, the example system 100 can be associated with a social networking service (or social networking system). The sender client 102 and the recipient client 104 can be users of the social networking system. The messaging system 110 can be a part of communications functionality provided by the social networking system. The filtering system 120 can also be provided by the social networking system.

In one example, the sender client 102 can attempt to send a message to the recipient client 104. When the sender client 102 sends the message, the sender client 102 can be making a request to the messaging system 110 to deliver the message to the recipient client 104. In some cases, the sender client 102 can access the social networking system via a website of the social networking system to send the message via the messaging system 110. In some instances, the sender client 102 can utilize an application associated with the social networking system, such as a mobile app of the social networking system, to send the message via the messaging system 110.

The messaging system 110 can be configured to work in conjunction with the filtering system 120. The messaging system 110 can communicate the sender client's request to deliver the message. The messaging system 110 can provide information associated with the message to the filtering system 120. In some implementations, the information can include, but is not limited to, an identifier for the sender client 102, an identifier for the recipient client 104, metadata associated with the message, as well as the contents of the message.

The filtering system 120 can be configured to receive the request to deliver the message. The filtering system 120 can utilize the message directing module 122 to determine how to direct the message, such as whether or not to direct the message to a primary messaging inbox of the recipient client 104. In some implementations, the message directing module 122 of the filtering system 120 can acquire relevant social data. In some embodiments, the social data can be acquired in or near real-time. The social data acquired can include information about the sender client 102 and/or the recipient client 104. The message directing module 122 of the filtering module 120 can make a determination or decision, based on the social data, regarding how to direct the message. In some instances, the determination or decision regarding how to direct the message can be made in or near real-time.

In some embodiments, the filtering system 120 can utilize a database of rules or policies for defining, detecting, and/or identifying undesired (e.g., inappropriate, illegitimate, unimportant, etc.) content. In some implementations, the message directing module 122 can include rules, policies, and/or logic for determining how to direct messages based on social data. If, for example, analysis of the social data indicates that the message from the sender client 102 to the recipient client 104 is likely appropriate for delivery to the primary inbox of the recipient client 104, then the message directing module 122 or the filtering system 120 can direct the messaging system 110 to do so. The message directing module 122 will be discussed in more detail below.

Figure 2:
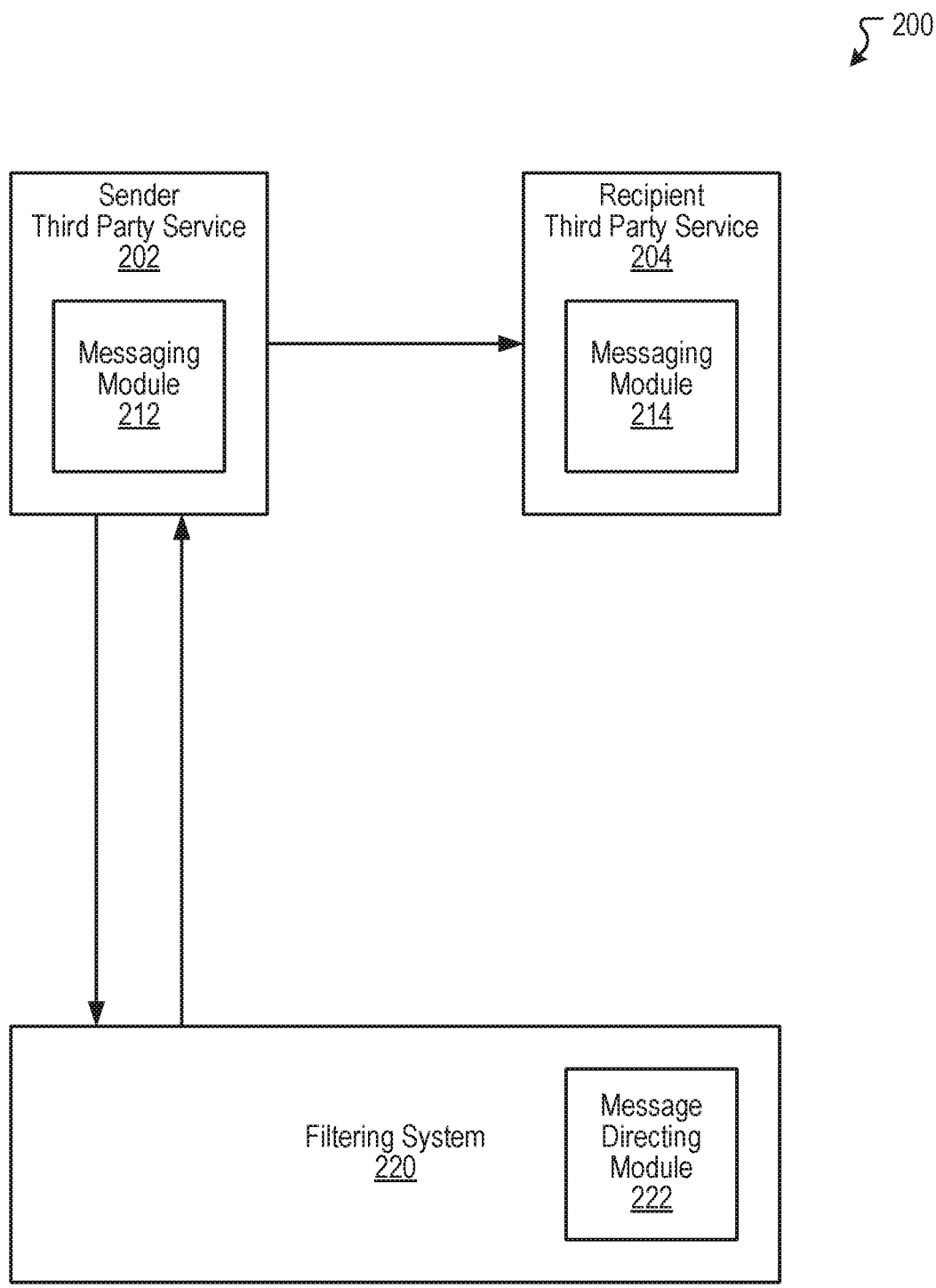
FIG. 2 illustrates an example system configured to facilitate directing messages based on social data, according to an embodiment of the present disclosure.

FIG. 2 illustrates an example system 200 configured to facilitate directing messages based on social data, according to an embodiment of the present disclosure. The example system 200 can include a sender third party service 202, a recipient third party service 204, and a filtering system 220.

As shown in the example of FIG. 2, the sender third party service 202 can include a messaging module 212, the recipient third party service 204 can include a messaging module 214, and the filtering system 220 can include a message directing module 222.

In some instances, various embodiments of the present disclosure can be implemented and/or can operate in conjunction with a third party service. The third party service can generally be associated with an entity that is separate, distinct, or independent from the social networking system. In an embodiment, the third party service and the social networking system may be controlled by a common entity. In the example of FIG. 2, the third party service can have a first instance and a second instance, such as the sender third party service 202 and the recipient third party service 204, respectively. Each instance of the third party service can have a respective messaging module, such as messaging modules 212 and 214. Accordingly, in this example, the sender third party service 202 and the recipient third party service 204 and their respective messaging modules 212 and 214 can be associated with the third party service. The filtering system 220 and its message directing module 222 can be associated with a social networking system. In an embodiment, the filtering system 220 can be part of a social networking system that constitutes a platform on which the third party service may rely to perform or support certain services.

In one example, the third party service can utilize a third party application. In this example, the sender third party service 202 can correspond to an instance of the third party application installed at a sender's computing device (or system). Likewise, the recipient third party service 204 can correspond to another instance of the third party application installed at a recipient's computing device. The messaging module 212 can correspond to a messaging feature or component available to the sender's application. Similarly, the messaging module 214 can correspond to a messaging feature or component available to the recipient's application. Moreover, the sender and the recipient can each have a corresponding account, profile, and/or instance within the social networking system.

Continuing with the example, the sender can initiate the transmission of a message, via the messaging module 212 of the sender's application, intended to be delivered to the messaging module 214 of the recipient's application. The sender's messaging module 212 can query or request the filtering system 220 of the social networking system for permission and/or instructions regarding how to deliver the message. The filtering system 220 can utilize the message directing module 222 to determine how to deliver the message. The message directing module 222 can, for example, acquire social data related to the accounts, profiles, instances, etc. of the sender and the recipient at the social networking system. The message directing module 222 can determine how to deliver the message based on the acquired social data. The message directing module 222 or the filtering system 220 can then instruct the sender's messaging module 212 regarding how to direct the message for delivery, such as whether to deliver the message to a primary or a secondary inbox within the recipient's messaging module 214.

In some embodiments, the third party service can correspond to at least one of a social networking application or service, a social media application or service, a communications (e.g., messaging, chat, email, etc.) application or service, a gaming application or service, or a location-based application or service.

Moreover, it is contemplated that numerous variations are possible. In one example, the social networking system can provide Application Programming Interfaces (APIs) for the third party service and/or can host messaging functionality for the third party service. In another example, with reference to FIG. 1, the sender client 102, the recipient client 104, and the messaging system 110 can be associated with the third party service, while the filtering system 120 can be associated with the social networking system, in at least some embodiments. The sender client 102 and the recipient client 104 of the third party service can also have respective corresponding accounts, profiles, and/or instances within the social networking system. The messaging system 110 of the third party service can be configured to provide communications functionality (e.g., message delivery). Accordingly, the third party service's messaging system can request permission and/or instructions from the filtering system of the social networking system regarding how to deliver messages.

Figure 3:
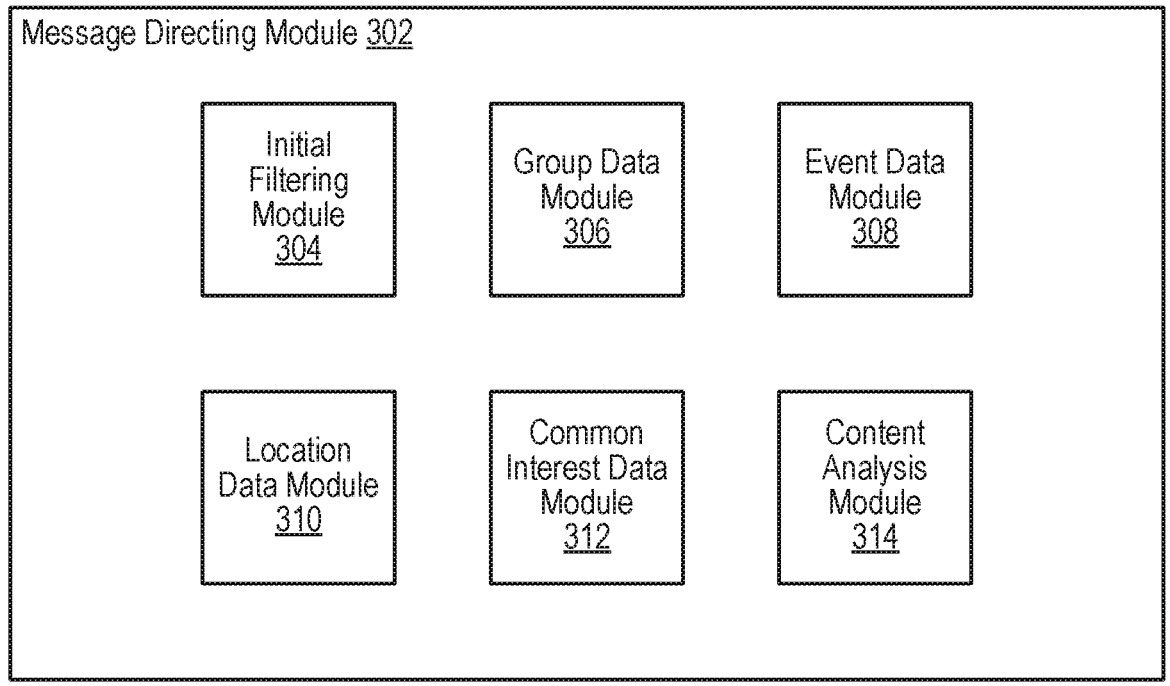
FIG. 3 illustrates an example message directing module configured to facilitate directing messages based on social data, according to an embodiment of the present disclosure.

FIG. 3 illustrates an example message directing module 302 configured to facilitate directing messages based on social data, according to an embodiment of the present disclosure. In some cases, the message directing module 122 of FIG. 1 and/or the message directing module 222 of FIG. 2 can be implemented as the example message directing module 302. As shown in FIG. 3, the example message directing module 302 can include an initial filtering module 304, a group data module 306, an event data module 308, a location data module 310, a common interest data module 312, and a content analysis module 314.

In some embodiments, the message directing module 302 can be configured to receive a request to send a message from a sender to a recipient. The message directing module 302 can be further configured to acquire, analyze, and/or utilize social data to facilitate determining how to direct, deliver, or send the message. In one example, when the sender sends the message to the recipient, the message is checked as legitimate or fraudulent. If the message is not immediately known to be illegitimate or fraudulent (e.g., spam, abusive, phishing, etc.), then an initial filtering process can be performed for the request to send the message. Then group data, event data, location data, common interest data, and/or other social data can be acquired and used to determine how to deliver the message.

In some instances, the message can be delivered to a secondary inbox of the recipient by default. For example, the secondary inbox can correspond to a message mail-box or folder labeled as "Other", while a primary inbox can correspond to a message mail-box or folder labeled as "Inbox". In some embodiments, the message directing module 302 can be configured to facilitate determining a confidence score for the message based on acquired social data. The message directing module 302 can also be configured to deliver the message to the primary inbox of the recipient instead of the secondary inbox when the confidence score satisfies a specified threshold. To the degree a message is assessed as likely being illegitimate or fraudulent based on a type or component of social data, the confidence score for the message accordingly may decrease. To the degree a message is assessed as likely being not illegitimate or not fraudulent based on a type or component of social data, the confidence score for the message accordingly may increase.

The initial filtering module 304 can be configured to implement or perform an initial filtering process for a request to send a message. The initial filtering module 304 will be discussed in more detail with reference to FIG. 4. The group data module 306 can be configured to acquire, analyze, and/or utilize group data to facilitate determining how to deliver messages. The group data module 306 will be discussed in more detail with reference to FIG. 5. Moreover, the event data module 308 can be configured to acquire, analyze, and/or utilize event data to facilitate determining how to deliver messages. The event data module 308 will be discussed in more detail with reference to FIG. 6.

The location data module 310 can be configured to acquire, analyze, and/or utilize location data to facilitate determining how to deliver a message from a sender to a recipient. In some embodiments, the location data can indicate at least one of a location quantity or a location frequency associated with a set of locations visited by the sender and the recipient. In some implementations, the location data module 310 can be configured to increase the confidence score for the message when the at least one of the location quantity or the location frequency is higher, and decrease (i.e., or not increase) the confidence score for the message when the at least one of the location quantity or the location frequency is lower. For example, if the sender and the recipient are determined to be within close proximity to each other at many different locations on numerous occasions, then there can be a higher likelihood that the message should be delivered to the recipient's primary inbox. Similarly, for example, if the sender and the recipient are determined to be frequently within close proximity to each other at a particular location, then there can also be a higher likelihood that the message should be delivered to the recipient's primary inbox.

In some embodiments, the set of locations visited by the sender and the recipient can be determined based on at least one of check-in data (e.g., location check-in via the social networking system), tag data (e.g., location tagging via the social networking system), global positioning system (GPS) data, WiFi data, Bluetooth data, near field communications (NFC) data, wireless signal (e.g., cellular) triangulation data, or wireless signal multilateration data.

Moreover, the common interest data module 312 can be configured to acquire, analyze, and/or utilize common interest data to facilitate determining how to deliver a message from a sender to a recipient. In some embodiments, the common interest data can indicate a set of common interests including, for example, at least one of a set of pages supported by the sender and the recipient or a set of applications installed by the sender and the recipient. In one example, the number of mutual page "Likes" between the sender and the recipient can increase the confidence score for the message. However, if the total number of "Likes" for a particular page is significantly high, then the confidence score may not necessarily be increased. In another example, the number and/or types of applications installed by the sender and the recipient can also affect the confidence score for the message.

Further, the content analysis module 314 can be configured to analyze at least a portion of content within a message. As such, the determination of whether to deliver the message to the primary inbox of the recipient can also be based on the analysis of the at least the portion of the content within the message. In some embodiments, content analysis of the message may be indicative of an illegitimate or fraudulent message. In one example, the presence of content in a message that is characteristic of advertising content may decrease the confidence score for the message.

Figure 4:
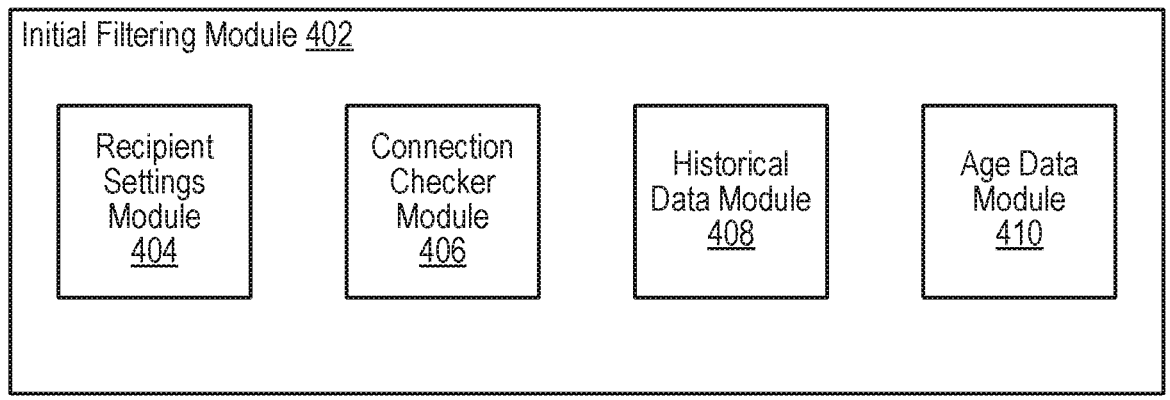
FIG. 4 illustrates an example initial filtering module configured to facilitate directing messages based on social data, according to an embodiment of the present disclosure.

FIG. 4 illustrates an example initial filtering module 402 configured to facilitate directing messages based on social data, according to an embodiment of the present disclosure. In some cases, the initial filtering module 304 of FIG. 3 can be implemented as the example initial filtering module 402. As discussed above, the initial filtering module 402 can be configured to implement or perform an initial filtering process for a request to send a message from a sender to a recipient. As shown in the example of FIG. 4, the initial filtering module 402 can include a recipient settings module 404, a connection checker module 406, a historical data module 408, and an age data module 410.

The recipient settings module 404 can be configured to determine that one or more privacy settings (e.g., account settings, message settings, etc.) of the recipient allow for communications with users who have the at least a specified number of degrees of separation with respect to the recipient. For example, the recipient settings module 404 can determine that the recipient has set basic, normal, and/or relaxed privacy settings for messages, as opposed to strict privacy settings. In one example, if the specified number of degrees of separation is three, then the recipient can potentially receive messages from not only friends and friends of friends, but also from friends of friends of friends and so forth. Otherwise, if the recipient has set stricter privacy settings, then the recipient can only receive messages from friends, and, in some cases, from friends of friends.

The connection checker module 406 can be configured to check the connections (if any) between the sender and the recipient, which can affect how the message should be delivered. The connection checker module 406 can check whether the sender and the recipient are connected (e.g., "Friends") within the social network, whether they have mutual or common connections (e.g., mutual "Friends") and, if so, the quantity or strength of those connections.

The historical data module 408 can be configured to determine that the recipient has not previously declined a connection request (e.g., "Friend" request) from the sender. If the recipient has previously declined a connection request from the sender, then the confidence score for the message can be decreased and the likelihood that the message should be delivered to the recipient's primary inbox can be decreased. Moreover, the historical data module 408 can be configured to determine that the sender has not been reported, within a specified time period, to be associated with undesired content (e.g., spam messages, abusive messages, phishing messages, etc.). For example, if the sender has previously been reported by other users within the last week as being a spammer, then the confidence score for the message can be decreased and the likelihood that the message should be delivered to the recipient's primary inbox can be decreased.

Additionally, the age data module 410 can be configured to determine whether the sender and/or the recipient at least meet a specified age threshold. For example, in some cases, if the sender (or the recipient) is less than 18 years old, then the message should not be delivered.

Figure 5:
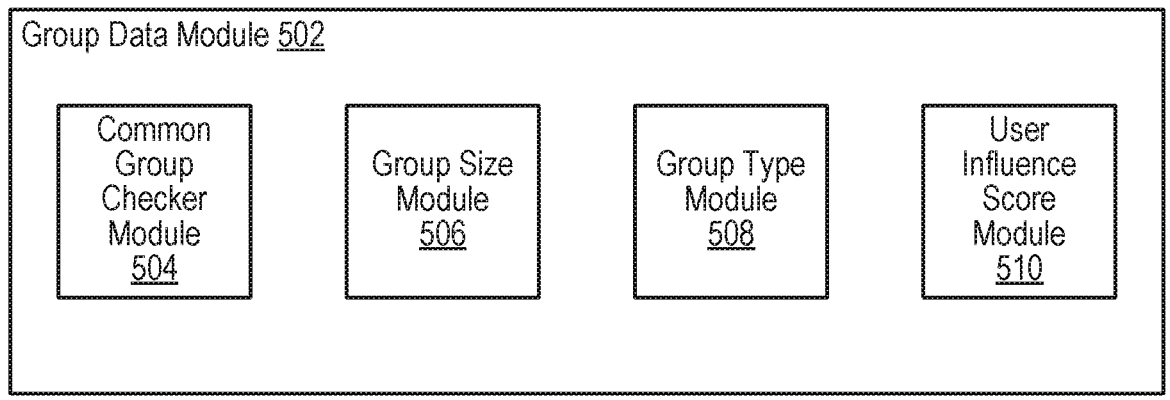
FIG. 5 illustrates an example group data module configured to facilitate directing messages based on social data, according to an embodiment of the present disclosure.

FIG. 5 illustrates an example group data module 502 configured to facilitate directing messages based on social data, according to an embodiment of the present disclosure. In some cases, the group data module 306 of FIG. 3 can be implemented as the example group data module 502. As discussed above, the group data module 502 can be configured to acquire, analyze, and/or utilize social data including group data, in order to facilitate determining how to deliver a message from a sender to a recipient. As shown in the example of FIG. 5, the group data module 502 can include a common group checker module 504, a group size module 506, a group type module 508, and user influence score module 510.

The common group checker module 504 can be configured to acquire social data including group data that indicates a set of one or more groups joined by the sender and the recipient within the social networking system. The group size module 506 can be configured to acquire social data including group data that indicates a membership size of a group within the set of groups joined by the sender and the recipient. As discussed above, a confidence score for the message can affect how likely the message is to be delivered to the recipient's primary inbox. The confidence score for the message can be increased when the membership size of a group joined by the sender and the recipient is smaller, and the confidence score for the message can be decreased (or may not necessarily be increased) when the membership size is larger.

In one example, the common group checker module 504 can determine that the sender and the recipient are both members of Groups A and B, while the group size module 506 can determine that the total number of members in Group A is seven people and that the total number of members in Group B is three people. As such, the confidence score for the message can be increased due to the smaller group sizes. In another example, the common group checker module 504 can determine that the sender and the recipient are both members of Group C only, while the group size module 506 can determine that the total number of members in Group C is 84,727 people. As such, in this example, the confidence score for the message can be decreased (or may not necessarily be increased).

Furthermore, in some embodiments, the group type module 508 can be configured to acquire social data including group data that indicates a type of a group within the set of groups joined by the sender and the recipient. For example, in some cases, whether a group type is public or private can affect the confidence score for the message. In some instances, when the sender and the recipient have both joined a private group, the confidence score of a message may be increased.

The user influence score module 510 can be configured to determine a user influence score, for example, for the sender. The user influence score can be indicative of a reputation of the sender within the social networking system. The confidence score for the message can be increased when the user influence score is higher, and the confidence score can be decreased when the user influence score is lower.

In some embodiments, the user influence score can be decreased when the sender is reported to be associated, within a specified time period (e.g., within the last week, within the past 48 hours, etc.), with undesired content.

In some embodiments, the user influence score can be decreased when the sender is reported to be associated, within a specified time period, with other users who are reported to be associated with undesired content.

In some instances, the user influence score module 510 need not be implemented and/or utilized within the group data module 502, but can be implemented and/or utilized elsewhere in the message directing module. Many other variations are also possible.

Figure 6:
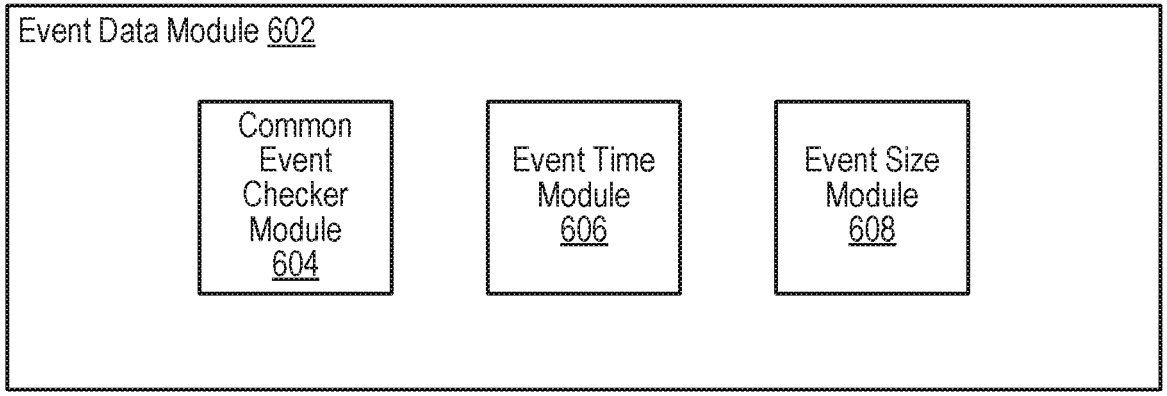
FIG. 6 illustrates an example event data module configured to facilitate directing messages based on social data, according to an embodiment of the present disclosure.

FIG. 6 illustrates an example event data module 602 configured to facilitate directing messages based on social data, according to an embodiment of the present disclosure. In some cases, the event data module 308 of FIG. 3 can be implemented as the example event data module 602. As discussed above, the event data module 602 can be configured to acquire, analyze, and/or utilize social data including event data, in order to facilitate determining how to deliver a message from a sender to a recipient. As shown in the example of FIG. 6, the event data module 602 can include a common event checker module 604, an event time module 606, and an event size module 608.

The common event checker module 604 can be configured to acquire social data including event data that indicates a set of one or more events attended or planned to be attended (e.g., or marked as "Attending", RSVP'd, etc.) by the sender and the recipient within the social networking system. The event time module 606 can be configured to acquire social data including event data that indicates a time frame for an event within the set of events attended by the sender and the recipient. As discussed above, a confidence score for the message can affect how likely the message is to be delivered to the recipient's primary inbox. In some cases, a time decay can be applied such that the confidence score for the message can be increased when the request to send the message is received closer in time to the time frame, and the confidence score for the message can be decreased (or may not necessarily be increased) when the request to send the message is received further away in time from the time frame.

In one example, if the message is received a few hours before the start time of an event to be attended by both the sender and the recipient, the confidence score for the message can be increased. This can be due, in part, to the assumption that messages sent within a close proximity to the start of the event can, for example, relate to organizing rides, setting up meeting times, setting up meeting places, acquiring tickets, and/or other desired message content. In another example, if the message is received a few hours after the end time of an event attended by both the sender and the recipient, the confidence score for the message can also be increased. This can be due, in part, to the assumption that messages sent within a close proximity to the end of the event can, for example, relate to feedback about the event, locating items (e.g., wallets, purses, electronics, etc.) lost at the event, and/or other desired message content.

Moreover, in some embodiments, the event size module 608 can be configured to acquire social data including event data that indicates an attendance size of an event within the set of events attended by the sender and the recipient. The confidence score for the message can be increased when the attendance size is smaller, and the confidence score for the message can be decreased (or may not necessarily be increased) when the attendance size is larger. Again, it is contemplated that many variations are possible.

Figure 7:
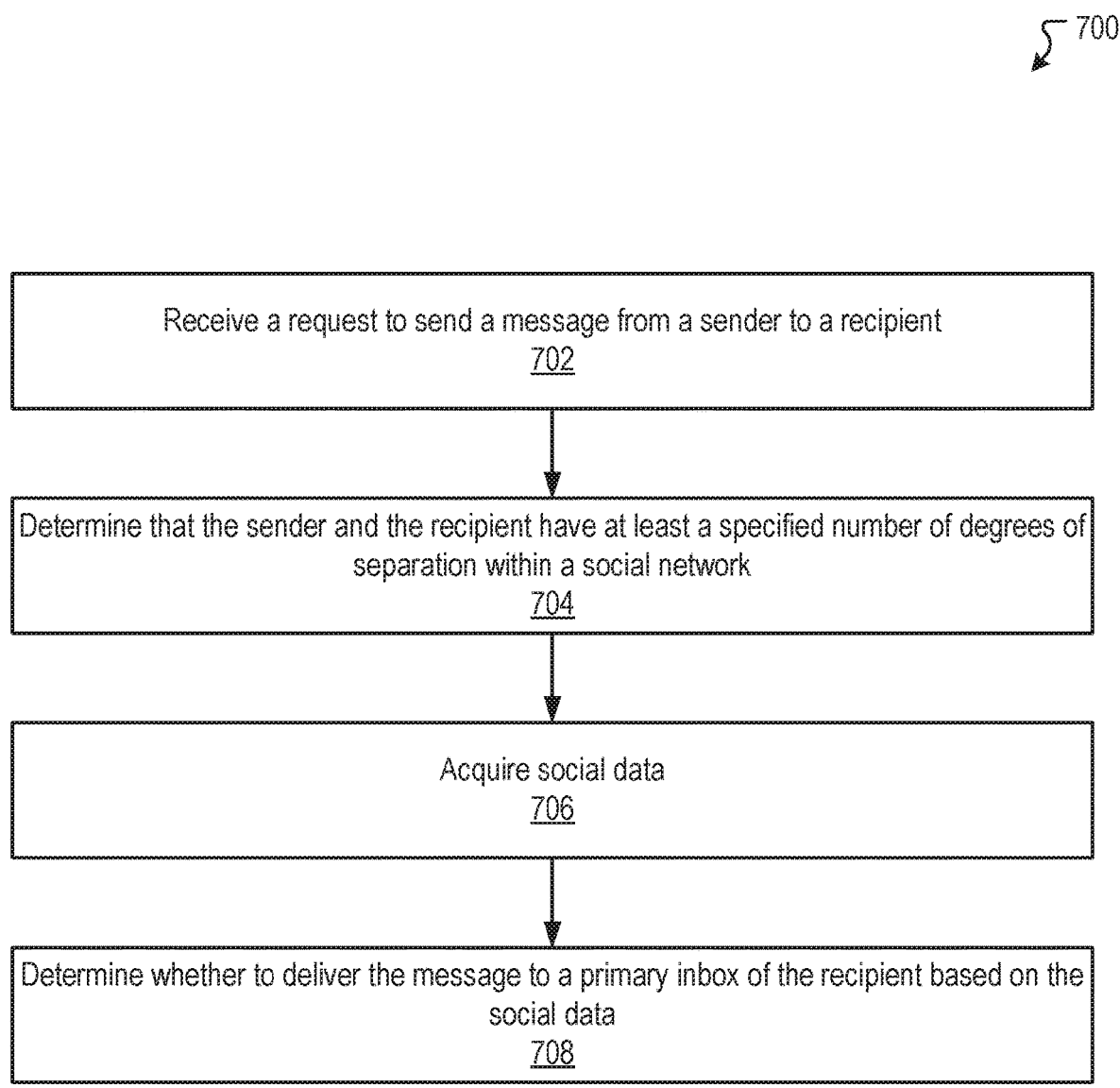
FIG. 7 illustrates an example method associated with directing messages based on social data, according to an embodiment of the present disclosure.

FIG. 7 illustrates an example method 700 associated with directing messages based on social data, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can receive a request to send a message from a sender to a recipient. For example, the sender can initiate the transmission of the message by selecting the recipient, creating the message, and clicking on a "Send" or "Submit" button.

At block 704, the example method 700 can determine that the sender and the recipient have at least a specified number of degrees of separation within a social network. In some embodiments, the at least the specified number of degrees of separation can correspond to at least three degrees of separation. This can mean that the sender and the recipient are not directly connected with each other (e.g., are not "Friends") within the social network. Additionally, the sender and the recipient do not have any mutual connections (e.g., mutual "Friends") between them.

At block 706, the example method 700 can acquire social data about at least one of a set of groups joined by the sender and the recipient, a set of events attended by the sender and the recipient, a set of locations visited by the sender and the recipient, or a set of common interests shared by the sender and the recipient. The social data can include, but is not limited to, group data, event data, location data, and/or common interest data, etc.

At block 708, the example method 700 can determine whether to deliver the message to a primary inbox of the recipient based on the social data.

Figure 8:
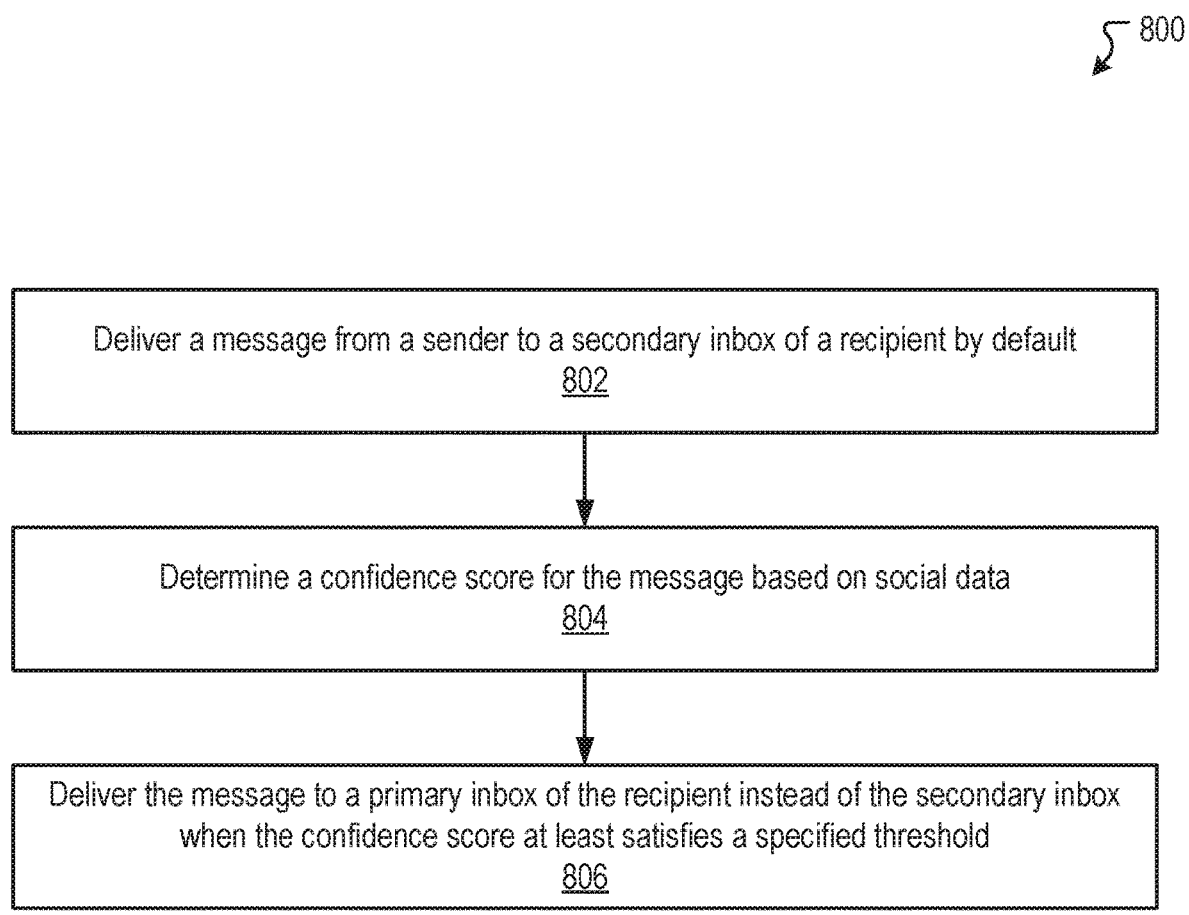
FIG. 8 illustrates an example method associated with directing messages based on social data, according to an embodiment of the present disclosure.

FIG. 8 illustrates an example method 800 associated with directing messages based on social data, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can deliver a message from a sender to a secondary inbox of a recipient by default. For example, the secondary inbox can correspond to a message mail-box or folder labeled as "Other", while a primary inbox can correspond to a message mail-box or folder labeled as "Inbox". At block 804, the example method 800 can determine a confidence score for the message based on social data. In some cases, the social data can be associated with at least one of the sender or the recipient. At block 806, the example method 800 can deliver the message to a primary inbox of the recipient instead of the secondary inbox when the confidence score at least satisfies a specified threshold.

In some embodiments, when the sender sends the message to the recipient, the message is checked for legitimacy or fraudulency. If the message is not immediately assessed to be illegitimate or fraudulent, then an initial filtering process (e.g., based on privacy settings, connection data, historical data, and/or age data, etc.) can be performed for the request to transmit the message. Then group data, event data, location data, common interest data, and/or other social data can be acquired and used to determine how to deliver the message.

In some embodiments, the disclosed technology can learn, improve, and/or be refined over time.

It is further contemplated that there can be many other uses, applications, and/or variations associated with the various embodiments of the present disclosure.

Social Networking System—Example Implementation

Figure 9:
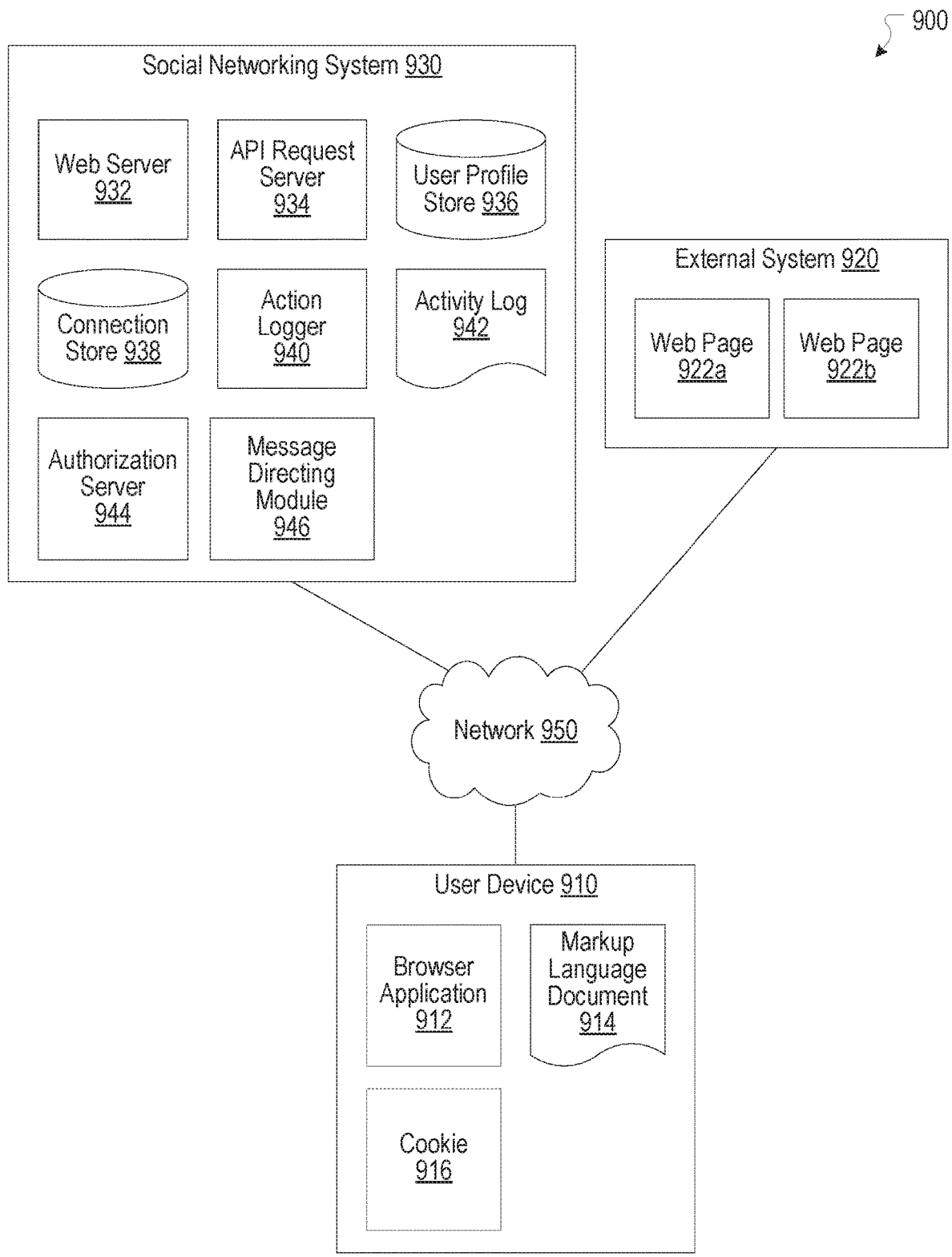
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "oneway." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a message directing module 946. The message directing module 946 can, for example, be implemented as the message directing module 122 of FIG. 1, the message directing module 222 of FIG. 2, and/or the message directing module 302 of FIG. 3. The message directing module 946 can be configured to receive a request to send a message from a sender to a recipient. The message directing module 946 can be configured to determine that the sender and the recipient have at least a specified number of degrees of separation within a social network. The message directing module 946 can also be configured to acquire social data about at least one of a set of groups joined by the sender and the recipient, a set of events attended by the sender and the recipient, a set of locations visited by the sender and the recipient, or a set of common interests shared by the sender and the recipient. Further, the message directing module 946 can be configured to determine whether to deliver the message to a primary inbox of the recipient based on the social data.

Hardware Implementation

Figure 10:
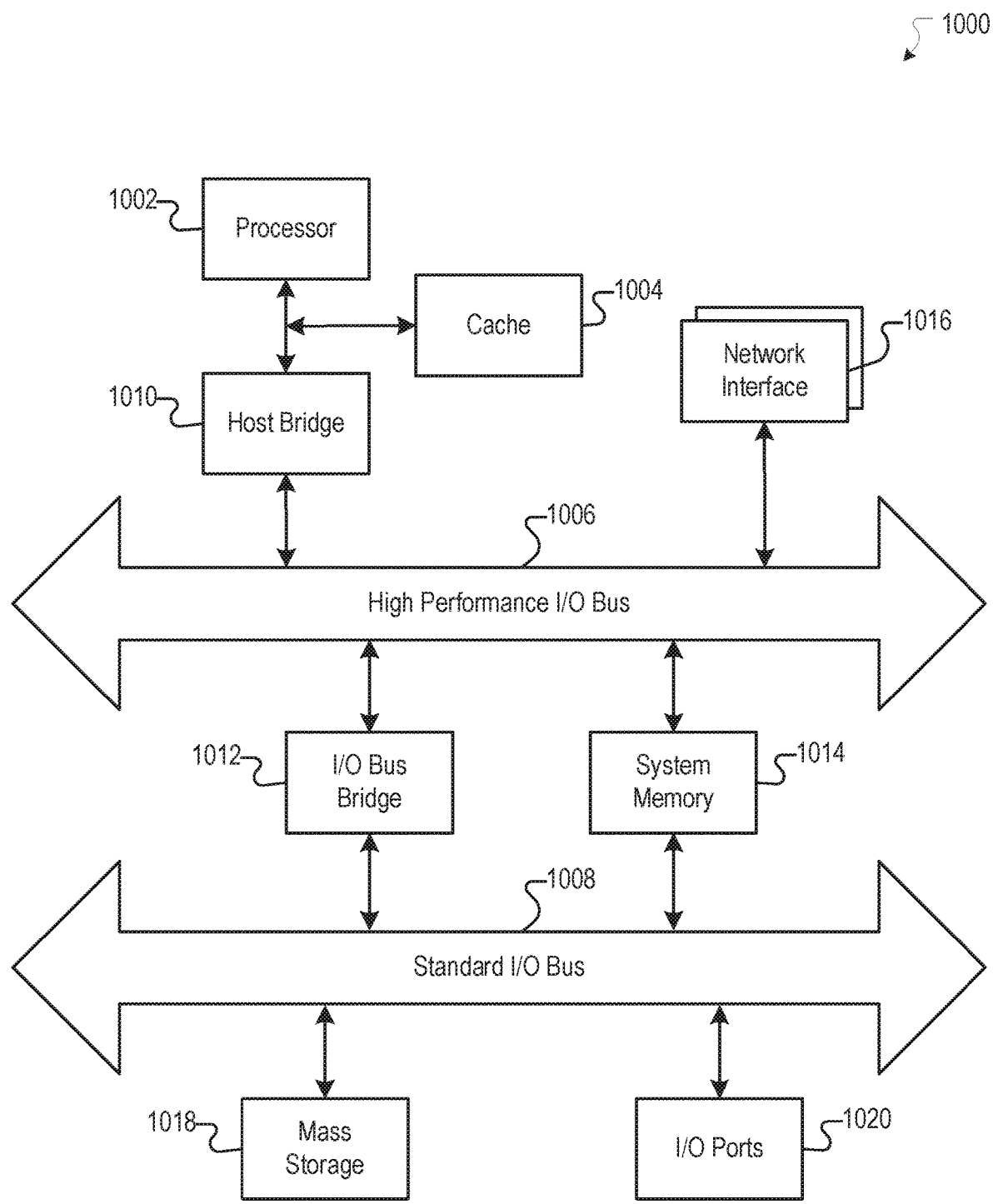
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A computer-implemented method comprising:
  receiving, by a computing system, a request to send a message from a sender to a recipient;
  delivering, by the computing system, the message from the sender to a secondary inbox of the recipient by default;

determining, by the computing system, that the sender has not been reported, within a specified time period, to be associated with undesired content determining, by the computing system, a confidence score for the message based on social data, wherein the social data includes whether the sender and the recipient have not declined a friend request from one another; and upon the confidence score satisfying a specified threshold, delivering, by the computing system, the message to a primary inbox of the recipient.

2. The computer-implemented method of claim 1, further comprising:

determining, by the computing system, that one or more privacy settings of the recipient allow for communications with users who have the at least a specified number of degrees of separation with respect to the recipient.

3. The computer-implemented method of claim 1, wherein the social data indicates a time frame for an event within a set of events attended by the sender and the recipient, wherein the confidence score for the message is increased when the request to send the message is received closer in time to the time frame, and wherein the confidence score for the message is decreased when the request to send the message is received further away in time from the time frame.

4. The computer-implemented method of claim 1, wherein the social data indicates an attendance size of an event within a set of events attended by the sender and the recipient, wherein a confidence score for the message is increased when the attendance size is smaller, and wherein the confidence score for the message is decreased when the attendance size is larger.

5. The computer-implemented method of claim 1, wherein the social data indicates at least one of a location quantity or a location frequency associated with a set of locations visited by the sender and the recipient, wherein a confidence score for the message is increased when the at least one of the location quantity or the location frequency is higher, and wherein the confidence score for the message is decreased when the at least one of the location quantity or the location frequency is lower.

6. The computer-implemented method of claim 1, wherein the determining a confidence score for the message is further based on an analysis of at least a portion of content within the message.

7. The computer-implemented method of claim 1, wherein the request is received from a third party service, wherein the sender and the recipient are associated with the third party service, and wherein the third party service provides, at least in part, communications functionality.

8. A system comprising:

at least one processor; and a memory storing instructions that, when executed by the at least one processor, cause the system to perform:

receiving a request to send a message from a sender to a recipient;

delivering the message from the sender to a secondary inbox of the recipient by default;

determining that the sender has not been reported, within a specified time period, to be associated with undesired content determining a confidence score for the message based on social data, wherein the social data includes whether the sender and the recipient have not declined a friend request from one another; and upon the confidence score satisfying a specified threshold, delivering, the message to a primary inbox of the recipient.

9. The system of claim 8, wherein the instructions, when executed by the at least one processor, further cause the system to perform:

determining that one or more privacy settings of the recipient allow for communications with users who have the at least a specified number of degrees of separation with respect to the recipient.

10. The system of claim 8, wherein the determining a confidence score for the message is further based on an analysis of at least a portion of content within the message.

11. The system of claim 8, wherein the social data indicates a time frame for an event within a set of events attended by the sender and the recipient, wherein the confidence score for the message is increased when the request to send the message is received closer in time to the time frame, and wherein the confidence score for the message is decreased when the request to send the message is received further away in time from the time frame.

12. The system of claim 8, wherein the social data indicates an attendance size of an event within a set of events attended by the sender and the recipient, wherein a confidence score for the message is increased when the attendance size is smaller, and wherein the confidence score for the message is decreased when the attendance size is larger.

13. The system of claim 8, wherein the social data indicates at least one of a location quantity or a location frequency associated with a set of locations visited by the sender and the recipient, wherein a confidence score for the message is increased when the at least one of the location quantity or the location frequency is higher, and wherein the confidence score for the message is decreased when the at least one of the location quantity or the location frequency is lower.

14. The system of claim 8, wherein the request is received from a third party service, wherein the sender and the recipient are associated with the third party service, and wherein the third party service provides, at least in part, communications functionality.

15. A non-transitory computer-readable storage medium including instructions that, when executed by at least one processor of a computing system, cause the computing system to perform a method comprising:

receiving a request to send a message from a sender to a recipient;

delivering the message from the sender to a secondary inbox of the recipient by default;

determining that the sender has not been reported, within a specified time period, to be associated with undesired content determining a confidence score for the message based on social data, wherein the social data includes whether the sender and the recipient have not declined a friend request from one another; and upon the confidence score satisfying a specified threshold, delivering, the message to a primary inbox of the recipient.

16. The non-transitory computer-readable storage medium of claim 15, wherein the instructions, when executed by the at least one processor of the computing system, further cause the computing system to perform:
determining that one or more privacy settings of the recipient allow for communications with users who have the at least a specified number of degrees of separation with respect to the recipient.

17. The non-transitory computer-readable storage medium of claim 15, wherein the determining a confidence score for the message is further based on an analysis of at least a portion of content within the message.

18. The non-transitory computer-readable storage medium of claim 15,
wherein the social data indicates a time frame for an event within a set of events attended by the sender and the recipient,
wherein the confidence score for the message is increased when the request to send the message is received closer in time to the time frame, and
wherein the confidence score for the message is decreased when the request to send the message is received further away in time from the time frame.

19. The non-transitory computer-readable storage medium of claim 15,
wherein the social data indicates an attendance size of an event within a set of events attended by the sender and the recipient,
wherein a confidence score for the message is increased when the attendance size is smaller, and
wherein the confidence score for the message is decreased when the attendance size is larger.

20. The non-transitory computer-readable storage medium of claim 15,
wherein the social data indicates at least one of a location quantity or a location frequency associated with a set of locations visited by the sender and the recipient,
wherein a confidence score for the message is increased when the at least one of the location quantity or the location frequency is higher, and
wherein the confidence score for the message is decreased when the at least one of the location quantity or the location frequency is lower.

* * * * *